United States Patent [19]

Blaker et al.

[11] Patent Number: 4,581,636

[45] Date of Patent: Apr. 8, 1986

[54] SCAN CONVERSION APPARATUS AND METHOD

[75] Inventors: David M. Blaker, Tempe; Juin-Jet Hwang; Christopher P. Zobkiw, both of Mesa, all of Ariz.

[73] Assignee: Advanced Technology Laboratories, Inc., Bothell, Wash.

[21] Appl. No.: 596,204

[22] Filed: Apr. 2, 1984

[51] Int. Cl.⁴ .............................................. H04N 7/01
[52] U.S. Cl. ..................................... 358/112; 358/140
[58] Field of Search ................. 358/112, 140; 128/660; 73/620

[56] References Cited

U.S. PATENT DOCUMENTS

| | | | |
|---|---|---|---|
| 3,805,596 | 4/1974 | Klahr . | |
| 4,214,269 | 7/1980 | Parker et al. | 358/140 |
| 4,236,221 | 11/1980 | Cribbs | 358/112 |
| 4,310,907 | 1/1982 | Tachita et al. | 358/140 |
| 4,387,365 | 6/1983 | Berry | 358/140 |
| 4,468,747 | 8/1984 | Leavitt | 358/112 |
| 4,471,449 | 9/1984 | Leavitt | 358/112 |

FOREIGN PATENT DOCUMENTS 2089537 6/1982 United Kingdom .
2114787 8/1983 United Kingdom .

OTHER PUBLICATIONS

"Mathematical Elements for Computer Graphics", by David F. Rogers & J. Alan Adams, pp. 165 & 166, McGray Hill, 1976.
"An Image Display Algorithm for Use in Real-Time Sector Scanners with Digital Scan Converters", by H. G. Larsen & S. C. Leavitt, pp. 763-765, 1980 Ultrasonics Symposium.
"Interpolation Scan Conversion in Pulse-Echo Ultrasound", by D. E. Robinson & P. C. Knight, pp. 297-310, Ultrasonic Imaging 4, 1982.
"A Scan Conversion Algorithm for Displaying Ultrasound Images", by Steven C. Leavitt, Barry F. Hunt, and Hugh G. Larsen, pp. 30-34, Oct. 1983, Hewlett Packard Journal.

*Primary Examiner*—Howard W. Britton
*Attorney, Agent, or Firm*—Lawrence S. Levinson; Sanford J. Asman

[57] ABSTRACT

An improved scan converter for converting received echo signals representative of the amplitude of ultrasound energy returning from sampled points along a plurality of spaced apart paths distributed in an image space into signals to be displayed as display pixels in a raster scan display system. The scan converter includes a scan data memory for storing the received echo signals in quadrants of the scan data memory. Each quadrant is associated with even and odd numbered paths and sample row combinations. Sample rows are related to sample points along the spaced apart paths. The scan converter further includes a circuit for determining a gray scale value to be assigned to each selected display pixel based on a predetermined combination of four received echo signals adjacent the selected display pixel and chosen from the quadrants of the scan data memory. The improved scan converter is capable of operation in both linear and sector scan modes, and, when in the sector mode, over 90° and 180° sectors. Variable scaling between the image space and display space and correction of the hose error when the scanning system employs an oscillating wobbler scan head are provided. Various techniques for converting display pixel rectangular coordinates into polar coordinates in real time for raster scan display are employed.

13 Claims, 14 Drawing Figures

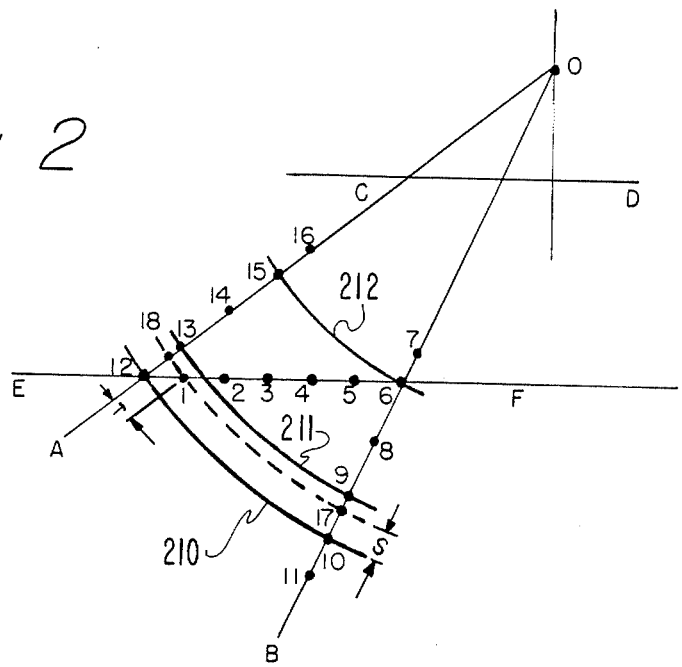
Fig. 2
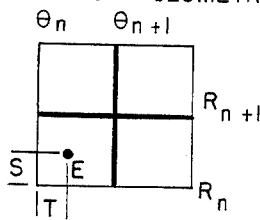
Fig. 3
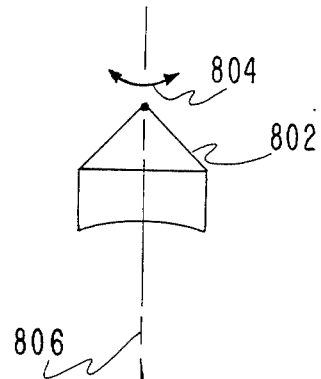
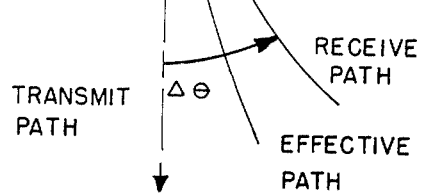
Fig. 8

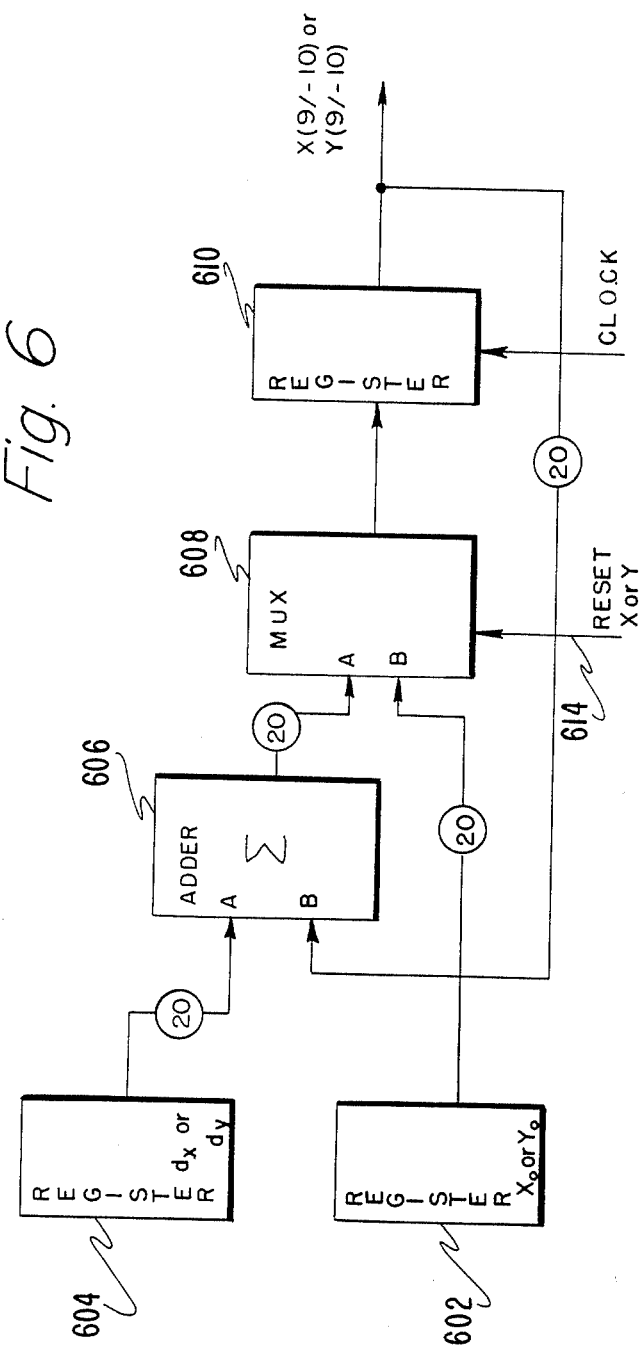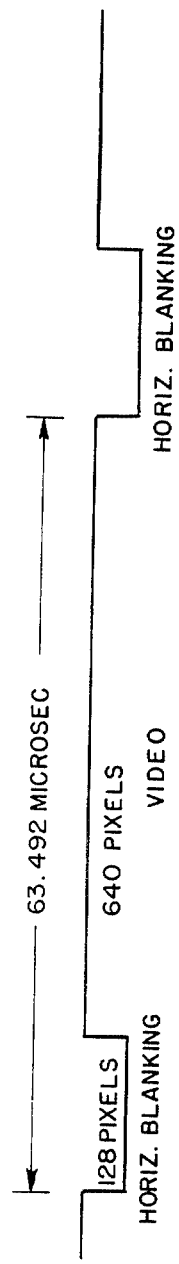

| CLK | | | | | | | | | | |
|---|---|---|---|---|---|---|---|---|---|---|
| 0 | ICR X (FIG 6) | | | | | | | | | |
| 1 | | FIND \|X\| (712) | | | | | | | | |
| 2 | | | COMP \|X\|;Y ASSIGN U;V (1104, 1106, 1108) | | | | | | | |
| 3 | | | | LUT 1/V (704 or 1112) | DELAY U | DELAY V | | | | |
| 4 | | | | | DELAY 1/V | SHIFT U (1118) | DELAY V | | | |
| 5 | | | | | | U/V (722 or 1114) | | DELAY V | | |
| 6 | | | | | | | LUT θ;Z (732;730;1124) | | DELAY V | |
| 7 | | | | | | | | θ=>LINE N₀ (1130) | V/Z (742) | DELAY V |
| 8 | | | | | | | | UNFOLD ANGLE (1134) | | V + V/Z RADIUS (744) |
| 9 | | | | | | | | ADD ROTATION OFFSET (1142) | | LUT HOSE CORR (762) | DELAY RADIUS |
| 10 | | | | | | | | | ADD HOSE CORR (760) | | ADD SKIN OFFSET |

| CLK | | | |
|---|---|---|---|
| 11 | DELAY FRAC COL(T) | DELAY FRAC ROW(S) | PROCESS INT COL (FIG 9) | PROCESS INT ROW (FIG 9) |
| 12 | DELAY | DELAY | FIND POINTS IN MEMORY | |
| 13 | DELAY | DELAY | LATCH POINTS FROM BUFFER | |
| 14 | DELAY | DELAY | FIND DIFF ROWS | DELAY SMALLER POINTS |
| 15 | DELAY | | (DIFF S) | DELAY |
| 16 | DELAY | | ADD ABOVE ($f_1$ and $f_2$) | |
| 17 | DELAY | | $f_1 - f_2$ | |
| 18 | | | $(f_1 - f_2)T$ | |
| 19 | | | $f_2 + (f_1 - f_2)T$ | |

SCAN CONVERSION APPARATUS AND METHOD

BACKGROUND OF THE INVENTION

This invention relates to ultrasound scanning, more particularly to digital scan converters and interpolation methods and their implementation.

When displaying echo signals representative of the amplitude of ultrasound energy returning from spaced apart paths distributed in an image space on a conventional raster scan display, there are usually many more display pixels (picture elements) than there are acquired image samples from the image space. This in part is due to fundamental constraints on the velocity of sound in the image object, such as human tissue in medical applications, and to the space and time resolutions of the transmitted ultrasound pulses. This results in a need to reconstruct the image space by interpolating between echo samples, that is, by assigning gray scale values to the interpolated pixels.

The above problem is further aggravated when employing sector scanning where the field of view spreads out as the depth of penetration increases. More acquired image data are available for use in interpolation and display near the pole of the sector while much less is available at the bottom of the sector. One dimensional along the raster (ATR) interpolation is one common scheme used in scan converters. The advantage of this method is low-cost; however, usually the image resolution is deteriorated; artifacts are generated; and the image has a very poor quality. In published UK patent application No. GB 2089 537 A a scan converter apparatus is disclosed in which at least four data samples along radial lines are used to interpolate data to be displayed along display points lying along orthogonal rows and columns. The use of four data samples helps alleviate the above mentioned problems of one dimensional along the raster (ATR) interpolation approaches.

However, not only should digital scan converters provide better resolution through more accurate interpolation but they should do so in a relatively inexpensive and simplified manner, and they should provide additional needed features not available or not easily implemented with non-digital converters. For example, digital scan converters should operate for either linear or sector scanning; provide for operation of various sizes of sector image spaces; provide for scaling between the image and display spaces so that the full display space is available for displaying only a portion of the image space or the full image space is displayed in only a portion of the display space; and provide for correction of other deterministic errors beside interpolation errors, such as, correction of certain errors associated with wobbler scanheads, etc.

SUMMARY OF THE INVENTION

An object of the present invention is to provide an improved digital scan converter particularly a digital scan converter for use with ultrasound scanning systems.

An object of the present invention is to provide an improved method and apparatus for interpolation when displaying the ultrasound image in a raster scan display.

Still another object of the present invention is to improve image quality through improved resolution and elimination or reduction of artifacts.

A further object of the present invention is to provide the digital scan converter as mentioned above which is relatively simple and inexpensive but which is capable of operation with linear or sector scanning.

In particular, another object of the present invention as referred to in the above paragraph is to provide for direct digital rectangular to polar coordinate transformation of each display pixel sucessively chosen from each raster scan line and interpolation thereof.

Another object of the present invention as described in any of the above paragraphs is to provide a scan converter for operation with either a 90° or 180° sector image space.

Still another object of the present invention as described above is to provide for a scaling between the image and display spaces.

Another object of the present invention as described above is to provide for correction of a wobble error when an oscillating transducer is used with an ultrasound scanning system.

The present invention comprises an improved scan converter for converting received echo signals representative of the amplitude of ultrasound energy returning from sampled points along a plurality of spaced apart paths distributed in an image space into signals to be displayed as display pixels in a raster scan display system. The scan converter includes a scan data memory for storing the received echo signals in quadrants of the scan data memory, each quadrant associated with even and odd numbered paths and sample row combinations, the sample rows associated with sample points along the spaced apart paths, and a circuit for determining a gray scale value to be assigned to a selected display pixel based on a predetermined combination of four received echo signals chosen from the quadrants of the scan data memory.

In the preferred embodiment at least a pair of scan data memories are employed. Received echo signals from a current scan of the image space are stored in one of the scan data memories while received echo signals from a previous scan, stored in the remaining scan data memory, are being combined to determine an interpolated gray scale value asynchronously from the storing of received echo signals from the current scan.

The above mentioned circuit includes a signal generating circuit which generates a pair of mixed signals that are associated with the selected display pixel. A memory addressing circuit in response to the integer portions of the mixed signals generates quadrant addresses of the four received echo signals to be combined.

The first mentioned circuit for determining a gray scale value further includes a filter circuit for combining the four received echo signals addressed by the addressing circuit and the fractional portions of the pair of mixed numbers. The filter circuit comprises additional circuits for forming a first intermediate gray scale value from a pair of received echo signals located on a first side of the selected display pixel and a first one of the fractional portions of the mixed pair of signals; a second intermediate gray scale value from a pair of received echo signals on a second side of said selected display pixel opposite the first side and the first fractional portion; and a final gray scale value from the first and second intermediate values and the remaining fractional portion.

The scan converter of the present invention is capable of operating with either linear or sector scan modes. Circuitry for generating the pair of mixed numbers associated with a selected display pixel includes a circuit for generating mixed orthogonal column and row signals for the linear scan mode and a circuit for generating mixed polar signals for the sector scan mode. A switching circuit provides either the mixed orthogonal signals or the mixed polar signals for use in determining the gray scale value to be assigned the selected display pixel depending on which scan mode is being employed.

The scan converter further includes a circuit for compensating for the hose error when an oscillating transducer scan head is used with the ultrasound scanner. Also, the scan converter includes a circuit for changing the scaling between the image and display spaces, and is capable of operation over either a 90 degree or 180 degree sector.

A coordinate conversion circuit for use in a scan converter when the sector scan mode is used includes a circuit for generating orthogonal x and y signals associated with the location of the display pixel within the display space, and a circuit for converting the x and y signals into polar signals associated with the location of the display pixel within the sector image space.

The conversion circuit further includes circuitry for folding the sector image space into a single smaller subsection; for determining an angle displacement of the display pixel within the single subsection; and for unfolding the sector image space to determine the angle signal of the polar signal pair associated with the display pixel.

In the preferred embodiment, the conversion circuit includes a circuit for generating w signals equal to the larger of the absolute value of the x signals and the y signals. v signals are generated equal to the smaller of the two signals.

When determining either the radial or angle signal of the polar signal pair the conversion circuit utilizes a circuit for providing an output signal proportional to w/v. w is a multibit number with more bits than the signal 1/v where the circuit producing 1/v uses less bits for 1/v than is contained in w. Further circuitry is included which selects a subset number of bits of w equal in number of bits to the number of bits in 1/v. The subset chosen differs depending on the magnitude of v.

The conversion circuit comprises a circuit for generating a radial signal proportional to y/Cos $\theta$ where Cos $\theta$ is derived from the x and y signals. The circuit for generating a radial signal further comprises a circuit for multiplying y and [(1/Cos $\theta$)−1] and a circuit for adding y to the output of the multiplying circuit.

Other objects, features and advantages of the present invention will become more fully apparent from the following detailed description of the preferred embodiment, the appended claims and the accompaning drawings in which:

BRIEF DESCRIPTION OF THE DRAWINGS

FIG. 2 is a representation of along the raster scan interpolation for sector conversion.

FIG. 3 is a representation in the memory geometry of the interpolation of the present invention for sector scan to raster scan conversion.

FIG. 4 is a timing diagram showing the number of display pixels present in a conventional raster scan.

FIG. 5 is a block diagram of the relationship of the geometries of the display, image and memory spaces.

FIG. 6 is block diagram of a first coordinate conversion portion of the address generator portion of FIG. 1.

FIG. 8 is a schematic representation of the wobble error present when oscillating transducers are used in ultrasound scanning systems.

FIG. 12a and 12B shows a state diagram showing the overall timing of the operation of the scan converter of FIG. 1 as shown in the Figures.

DETAILED DESCRIPTION OF THE DRAWINGS

Figure 1:
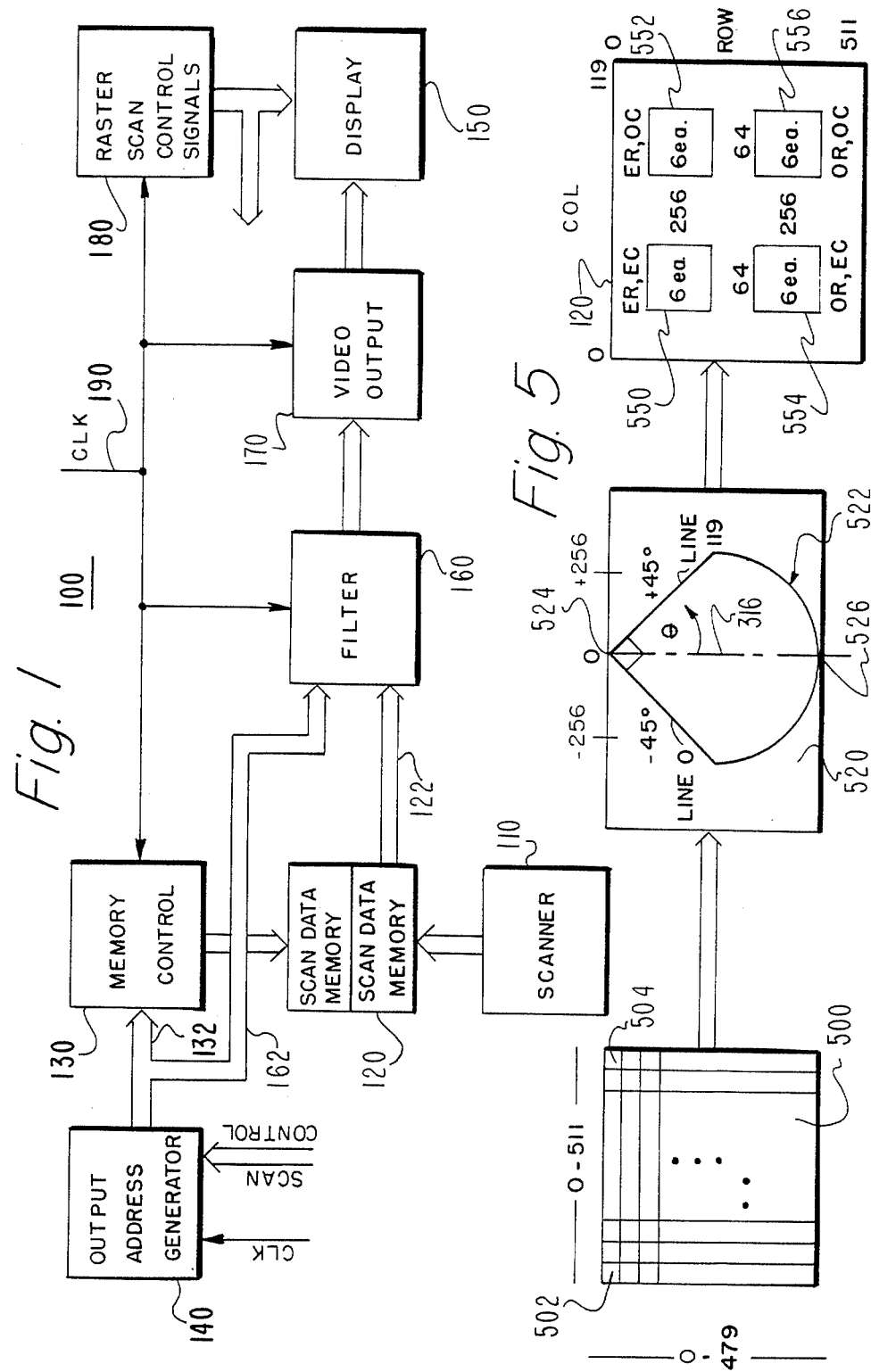
FIG. 1 is a block diagram schematic of an ultrasound scanning system including the preferred embodiment scan converter of the present invention.

Referring now to FIG. 1, a block diagram schematic of an ultrasound scanning system designated generally 100 is shown comprising: an ultrasound scanner 110 for generating samples of ultrasound echos to be stored in a scan data memory 120 under the control of memory controller 130; an output address generator 140 which in conjunction with memory controller 130 generates addresses of data stored in the scan data memory which data is to be used in assigning a gray scale value to a selected display pixel of the display 150; a filter 160 for interpolating the gray scale value to be assigned to a selected display pixel based on the data from the scan data memory and on output signals from the address generator 140; a video output circuit 170 for interfacing the output of filter 160 to display 150; and raster scan signal generator 180 for controlling the raster scan of the display 150, and for providing control signals to the address generator 140 to synchronize operation of the address generator 140, scan data memory 120 and filter 160 to the display 150. Basic timing for the system 100 is provided by a 12.4 MHz clock furnished over line 190.

Scanner 110 is of conventional design and comprises an ultrasound transducer which transmits ultrasound pulses along a plurality of spaced apart paths into an image medium such as human tissue. The scanner 110 and its transducer may be adapted to transmit along parallel and spaced apart paths (linear scanning) or along angularly spaced apart paths with the pulses for each path originating at the same origin, i.e., the pole of the sector being scanned.

As a pulse travels along a particular path it encounters tissue boundaries and discontinuities causing echos to be reflected back along the path where they are detected by the transducer. After a pulse is transmitted the transducer electrical output is sampled at a preselected rate resulting in a plurality of acquired data samples being generated per path. The time elapsed between transmission of a pulse and each sample of an echo is related to the depth of penetration within the object under investigation of the source of the echo such as a tissue boundary or other discontinuity.

Scan data memory 120 comprises two pages of high speed static RAM memory, each page capable of holding 512 rows by 128 columns by 6 bits of data. Ultrasound echos signals being received by scanner 110 during a current image space scan are stored in one page of memory 120 while data stored in the other page from the previous image space scan is being used for display.

Writing of data into one page is done independently of the reading of data from the other page for display. It is therefore unnecessary to synchronize operation of the apparatus with the timing of the scanner 110. When it is decided to shift from one page to the other for display, it is done independently of the position of the transducer beam.

Referring now to FIG. 2, a prior art method of interpolating display points along a raster scan line using a pair of sample points is shown. FIG. 2 shows an origin O of a sector scan with two spaced apart paths or radials $O\theta_n$ and $O\theta_{n+1}$ along which ultrasound pulses travel. The return echos are sampled periodically along each radial at points 12–16 for $O\theta_n$ and 11–7 for $O\theta_{n+1}$. Point pairs 6, 15; 8, 14; 9, 13; and 10, 12 each lie along common arcs, e.g. arc 210 ($R_n$) for point pair 10, 12; arc 211 ($R_{n+1}$) for point pair 9, 13; and arc 212 for point pair 6, 15. Raster scan lines CD and EF are also shown superimposed on the sector scan geometry. Points 1, 2, 3, 4 and 5 are display points requiring interpolation for display in the display space. In the prior art, sample points 12 and 6 have been used to interpolate for the points 1–5. However, points 12 and 6 are only weakly related acoustically to the points 1–5 since they are sampled by the transmitted ultrasound wave at a different phase and different lateral bandwidth, i.e., they are located on different arcs and radials. Using these two points to interpolate the other points, the reconstructed image may suffer resolution discontinuiy and degradation resulting in artifacts and poor image quality.

In the preferred embodiment of this invention, instead of using sample points 12 and 6 to interpolate the filled-in data point 1, intermediate data points 17 and 18 are first interpolated and the value of data point 1 is then calculated using the intermediate data points 17 and 18. Locations of point 1 relative to points 12, 10, 9 and 13 are used in the computation. As shown in FIG. 2, the values of S and T are used in the computation. Published UK patent application No. GB 2 089 537 A describes how the various sample points can be combined to interpolate a value for 1 and more will be said about how this is done in the preferred embodiment of this invention hereinafter. Although FIG. 2 only shows a sector scan the same can be said of a linear scan.

Referring back to FIG. 1, display 150 is a conventional raster scan display such as a CRT operating in a U.S. black and white TV format, RS-170A NTSC standard broadcast video. In display 150 under the control of raster scan control signals from generator 180, an electron beam is swept horizontally across the face of the CRT at a rate of 15,750 sweeps/sec while being swept from the top to the bottom of the screen at a 60 Hz rate. Each image frame, therefor, is capable of 525 horizontal sweeps while each line or sweep is completed in 63.492 microseconds. Approximately 55 microseconds per line is allowed for the image display while the beam is allowed to retrace during an 8 microsecond interval before beginning a new trace.

FIG. 4 shows the timing of one horizontal sweep and retace. In the ultrasound system 100 it is divided up into 768 display pixels with 640 display pixels occurring during the video portion. The pixels are generated using a 12.4 MHz clock for 768 pixels/line or 63.492 microseconds per line. In the preferred embodiment, the actual display space uses only 512 pixels of the 640 and 480 of the 525 lines per frame yielding a 512 by 480 matrix of display pixels.

Referring now to FIGS. 5 and 6, the display space of display 150 in FIG. 1, represented as display space 500 in FIG. 5, consists of a 512×480 matrix of display pixels shown as rows 0–511 and columns 0–511 in space 500. In scanning from left to right and top to bottom pixel 502 in FIG. 5 is located in row 0, column 0. However, in the preferred embodiment the coordinate of each display pixel in space 500 is translated into x and y coordinates in the intermediate data space 520. For example, display pixel 502 at location 0,0 is translated into coordinates −256, 0 in space 520 while display pixel 504 at coordinate 511, 0 is tanslated into coordinate 255, 0 in space 520.

The circuit which performs this translation is designated generally 600 in FIG. 6. Only a single coodinate translation circuit is shown but an identical circuit is used for the second coordinate. An initial value of a coordinate, e.g. −256 is loaded into register 602 and a coordinate Δ value, e.g. 1.0, is loaded into register 604. The output of register 604 is loaded into the A input terminals of an adder circuit 606, the output of which is connected to the A input terminals of a multiplexer circuit 608. The output of register 602 is provided to the B input terminals of multiplexer 608. The output of multiplexer 608 is loaded into a register 610. The output of register 610 is a twenty bit coordinate address in the intermediate data space 520. The output of register 610 is provided to the B input terminals of adder circuit 606. Register 610 is clocked by the basic 12.4 MHz clock.

At the start of each raster scan line of the display space by display 150 a reset signal is generated by generator 180 which is transmitted to multiplexer 608 via line 614 to select the B input for output by multiplexer 608 to register 610. Thereafter, with each clock until the end of the scan line the A input is selected by multiplexer 608 for the output. After the first pixel of a scan line the Δ value in register 604 is added to provide the next pixel x coodinate successively throughout the scan line. Generally, the same is true for the y coordinate except that the reset signal is provided at the beginning or end of each frame not each scan line.

The relationship of the image space, that is, the actual area being examined by the ultrasound beam, to the intermediate data space is shown most clearly by showing a typical 90° sector image space designated generally 522 superimposed in the rectangular intermediate data space 520. The pole 524 of the sector is located at value x=0, y=0 while the bottom most porton 526 of the sector is located at x=0, y=511. The polar axis of the sector lies along the y axis (x=0) of the data space 520 and positive polar angle $\theta$ is measured in a counter-clockwise direction from the y axis. Typically, a full linear scan image space would lie between x values 0 to 120 and y=0 to 511.

If the full image space is to be displayed in the full display space then the initial x value is −256, the x Δ value is 1.0, the initial y value is 0 and the initial y Δ value is 511/479. However, there are a plurality of initial values which can be chosen and a plurality of Δ values. By appropriate selections of the initial values and Δ values the circuit 600 provides scaling between the image space and the display space whereby the full image fills a quarter of the screen (e.g. chose initial x and y values equal to −256 and 0, respectively, and set the Δ value equal to 2 for both) or the full screen displays a 64th of the full image (choose some starting values x and y and choose the Δ values for both to be 0.125) or any value arbitrarily in between.

In the preferred embodiment, approximately 120 separate paths are generated by ultrasound pulses and 512 samples of the echo return of each path taken within one TV frame. Hence, the image space can be thought of as comprising 120 columns and 512 rows of acquired data samples, all of which are to be stored in a particular way in a page of scan data memory 120. FIG. 5 shows diagrammatically that each page of scan data memory 120 is partitioned into four independently addressable quadrants labelled: even row/even column (ER, EC) 550; even row, odd column (ER, OC) 552; odd row, even column (OR, EC) 552; and odd row, odd column (OR, OC) 556. Each quadrant comprises 6 Hitachi 16K×1 CMOS static RAMs (Model No. HM6167HP-55), each 16K×1 RAM arranged as a matrix of 256 rows by 64 columns. Six are provided in order to store a 6 bit word (for each data sample) at each RAM address location.

Each of the 120 separate paths is assigned a separate line or column number for 0 to 119, the numbers being assigned sequentially to adjacent paths. Similarly, sample rows of data are assigned a number from 0 to 511. Even numbered paths are stored as columns of data in memory quadrants 550 and 554 while odd numbered paths are stored in quadrants 552 and 556. Within each column of memory, whether even or odd, even sample rows of data are stored in either quadrants 550 or 552 while odd sample rows are stored in either quadrants 554 or 556. Control of the addressing of the memory quadrants is done by memory control 130 in accordance with the well known addressing requirement of the Hitachi memory devices used in the preferred embodiment in conjunction with a modulo 2 counting circuit to implement the even/odd memory segmentation into four quadrants.

FIG. 6 is part of the output address generator 140 of FIG. 1. It generates 20 bit mixed number x and y coordinates in the intermediate data space 520, each of which x and y coordinate pair is associated with a display pixel in the display space 500 for display on display 150. By mixed numbers it is meant that in general they have a multibit integer portion and a multibit fractional portion.

Figure 7A:
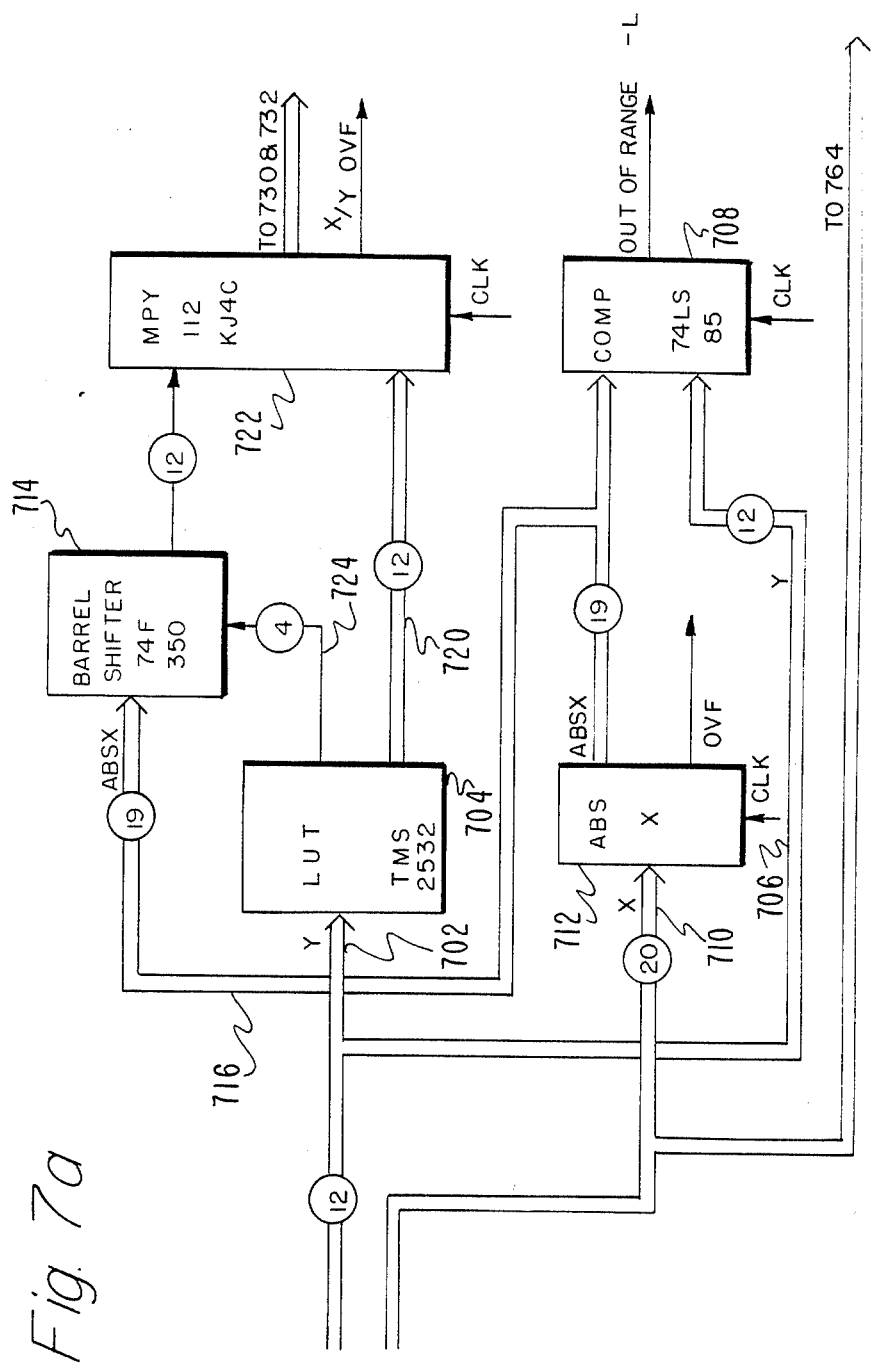
FIG. 7a and 7B shows a detailed block diagram of the address generator portion of FIG. 1.
Figure 7B:
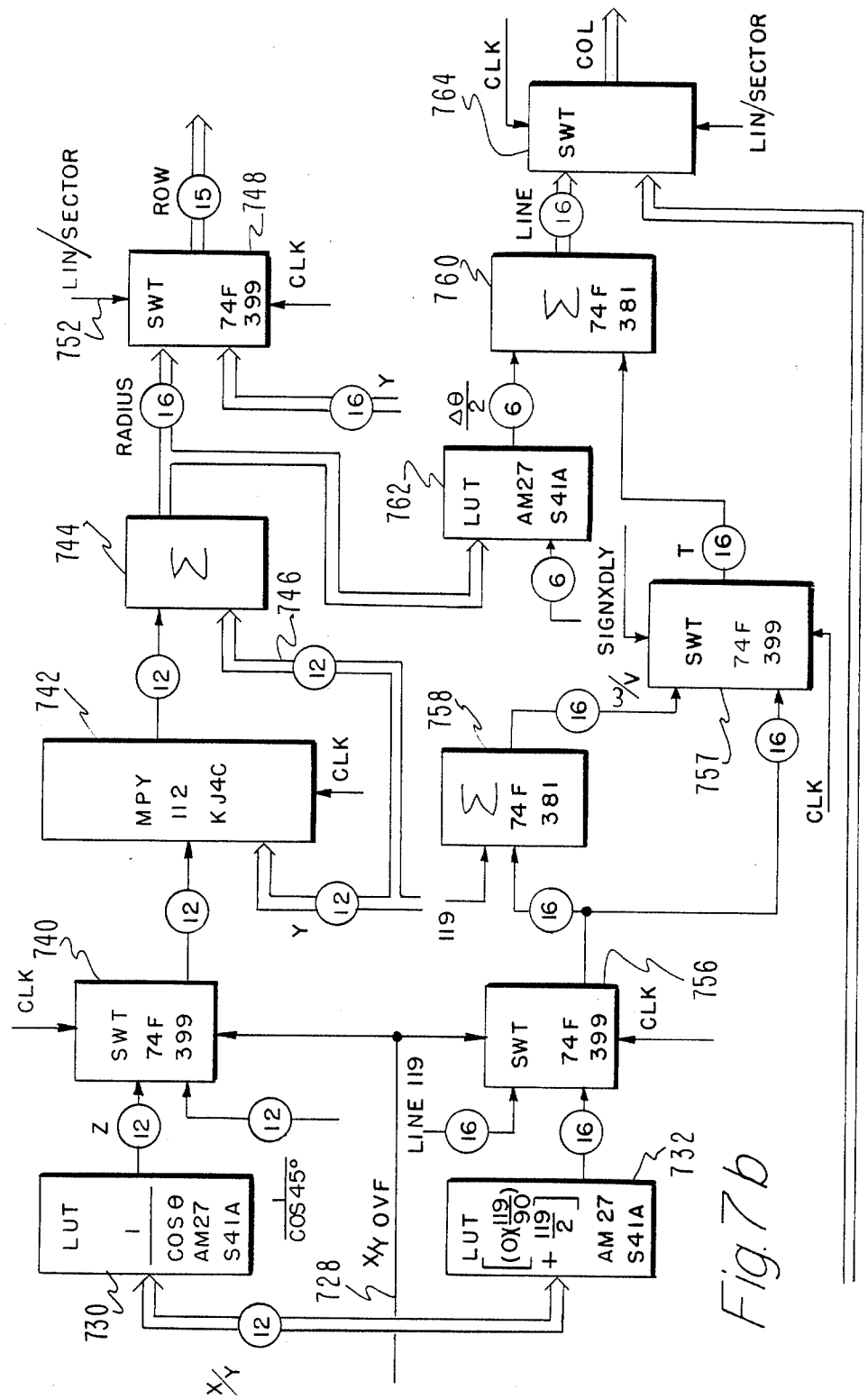

For sector image scanning, the x and y coordinates are provided to scan converter circuitry designated generally 700 in FIG. 7. Scan converter circuiting 700 takes the multibit x and y coordinate numbers and converts them to multi bit r and $\theta$ polar coordinate mixed numbers. This conversion is done by circuitry 700 in real time at the pixel clock rate for each display pixel chosen successively along a raster scan line for the entire frame. For each display pixel in real time, the integer portions of r and $\theta$ are used by the memory addressing circuitry designated generally 900, which is part of memory control 130, for generating four addresses simultaneously of the four sample image points in scan data memory 120 which are adjacent the selected display pixel, i.e. adjacent in a manner as described in connection with FIG. 2. The four sample data are provided to filter circuit 160 via lines 122. The fractional portions of r and $\theta$ are provided via lines 162 to filter 160 and together with the four sample data are combined in a predetermined way to generate an interpolated gray scale value for the selected display pixel.

For linear sector scans the interger portions of x and y are used directly by the memory addressing circuits and the fractional portions by filter 160 without further conversion by circuitry 700. The fractional portions of x and y are used to determine the location of the display pixel relative to the location of the four sample data in the image space.

Conversion of x and y coordinates into r and $\theta$ first requires providing a signal equivalent to ABSx/y. Then mixed signals representing $\theta$ and r are provided as follows:

$$\theta = \tan^{-1}(ABSx/y)$$

$$r = y/\cos\theta$$

Since the display space 500 is a 512 by 512 matrix of display pixels, x and y must contain at least 9 integer bits each to define uniquely each display pixel. Because of the capability of scaling between image and display spaces by FIG. 6 circuitry and because of the need to convert into r and $\theta$ coordinates, conversion of the dispaly space coordinates of each display pixel into the x and y coordinates of the intermediate data space and subsequent conversion into polar coordinates when desired will not in general yield integer number coordinates but will include fractional portions. Hence, the x and y coordinate signals must also contain a number of bits to represent the fractional portion. In the preferred embodiment a 12 bit y number is used in the above generation of ABSx/y, r, and $\theta$ while a 20 bit x signal is used. In order to provide ABSx/y, r, and $\theta$ for such large multibit signals in real time, certain ingenious circuit implementations are employed.

Referring now to FIG. 7, a 12 bit y coordinate signal is provided via bus 702 to a look up table (LUT) circuit 704. The 12 bit y coordinate signal is also provided via bus 706 to a comparator circuit 708. Bits 0–8 represent the integer portion of y while bits −1 to −3 represent the fractional portion. A 20 bit x coordinate signal is provided via bus 710 to a circuit 712 which provides a signal equal to the absolute value of x, ABSx. Bits 0–8 represent the integer portion of x while bits −1 to −10 represent the fractional portion. Since x can be either positive or negative it is furnished in 2's complement form and bit 9 is used in conjunction therewith.

Circuit 712 outputs a 19 bit parallel signal which represents the ABSx and which output is provided to the comparator circuit 708 and to a barrel shifter circuit 714 via parallel bus 716.

LUT circuit 704 takes the 12 bit y coordinate input signal and inverts it and provides a 12 bit output signal 1/y via bus 720 to one input of multiplier circuit 722. Based on the value of y a four bit signal is provided via bus 724 by LUT circuit 704 to barrel shifter circuit 714. In response to the four bit signal, circuit 714 provides 12 bits of the 19 bit ABSx input signal via bus 726 to multiplier circuit 722 for multiplication with 1/y.

In the 90° sector 522 shown in FIG. 5, the boundaries of the sector are shown at $\theta = \pm 45°$, or at the lines x=y. When y is smallest so is the range of values of x and the 12 least significant bits of ABSx are chosen for multiplication with 1/y by circuit 714 in response to the four bit signal on bus 724. At mid range values of y, the middle 12 bits of ABSx are chosen by circuit 714 while at the largest values of y the range of x is largest and the twelve most significant bits of ABSx are chosen by circuit 714 again in response to the signal in bus 724. Whenever ABSx/y is equal to or greater than one, multiplier circuit 722 provides a high level x/y OVF signal on line 728.

Multiplier circuit 722 provides a 12 bit ABSx/y signal having a 9 integer bits and 3 fractional bits to LUT circuit 730 and LUT circuit 732 for determination of r and θ signals, respectively. Investigating first generation of r=y/Cos θ, the LUT circuit 730 provides a 12 bit signal related to the function 1/Cos-[Tan$^{-1}$(ABSx/y)]. LUT circuit 730 provides a 12 bit signal for each of the $2^{12}$ possible input values of the 12 bit ABSx/y signal. Three AM27541A devices are used for this purpose. θ ranges from 0° to 45° and therefore 1/Cos θ ranges between 1/Cos(0°) and 1/Cos(45°), or in binary between 1.000 . . . and 1.0[110101000001]0. Recognizing that the binary value of 1/Cos θ only varies in the twelve bits in the bracket shown above, LUT circuit 730 provides only this fractional portion of 1/Cos θ. Hence, LUT circuit 730 provides the function [(1/COS θ)−1]. y/Cos θ can be written as y(1+z) where z=[(1/Cos θ)−1]. Therefore, the twelve bit output signal of LUT circuit 730 passes through switch 740 to multiplier 742 where it is multiplied with the 12 bit y signal to form yz. The output of multiplier 742 is provided to summing circuit 744 along with the 12 bit y signal from bus 746 to form y+yz=y/Cos θ.

The output of summing circuit 744 is a 16 bit signal representing the radial distance, r, of the selected display pixel with intermediate data space coordinates x, y from the origin, 0, of the sector 522. By storing only the 12 bits of the fractional portion of 1/Cos θ which varies as θ varies between 0° and ±45° and by using the equation y=y+yz to calculate y/Cos θ, a 12 bit calculation of y/Cos θ is readily accomplished.

In order to provide a straight line along the radials θ=±45° to define sharply the sector 522, the x/y OVF signal from LUT circuit 722 which indicates ABSx≧y, or equivalently that θ=±45°, is transmitted to switch 740 which in response to the x/y OVF signal provides an output signal equal to the fractional protion of 1/Cos 45° regardless of the value of z from LUT circuit 730.

The 16 bit radius number r, is provided along with a 16 bit y value from register 610 to switch 748. (Remember the signal y number from register 610 was 20 bits.) If the scanning mode is linear then switch 748 provides a 15 bit row output signal from the y input in response to a Lin/Sector signal 752; if the scanning mode is polar then switch 748 in response to signal 752 provides a 15 bit row signal taken from the 16 bit radius signal, r, from summing circuit 744. The 15 bit row signal contains a 9 bit integer portion and a 6 bit fractional portion. The least significant fractional bit is dropped. The 15 bit row signal represents the number of the sample row along the spaced apart paths.

The 12 bit ABSx/y output signal from multiplier circuit 722 is also provided to LUT circuit 732. θ can be calculated from ABSx/y by the function, $$\tan^{-1}(ABSx/y) = \theta$$

Each θ value must be assigned a mixed line number which relates to one of the 120 scan paths referred to earlier which cover the sector image space. (Remember during the scan of the sector image space by scanner 110, 120 ultrasound pulses are transmitted defining 120 angularly spaced apart paths within the sector image space.) LUT circuit 732 in response to ABSx/y provides a 16 bit output signal which comprises a 9 bit integer portion and a 7 bit fractional portion. The LUT circuit 732 output signal combines the calculation of θ and the assignment of a mixed line number to be assigned to θ.

In the preferred embodiment, the 120 paths covering the sector from −45° to plus 45° are assigned line numbers 0 to 119, with line number 0=−45° and line number 119=+45°. Each θ derived from tan$^{-1}$(ABSx/y) is translated into a line number by recognizing that, line no=(θ)(119/90)+119/2.

LUT 732 is programmed to provide the above line number in response to ABSx/y. Hence, θ=45° yields line number 119. θ=0° yields line number 119/2 =59.5.

Since the LUT circuit 732 responds to ABSx/y there is no provision for calculating a line number for negative θ in LUT circuit 732. However, the output of LUT circuit 732 passes through switch 756 directly to switch 757 or to summing circuit 758. The other input to summing circuit 758 is a 16 bit signal for line no. 119. When x is negative then θ should be negative and a positive signal SIGNXDLY is provided to switch circuit 757 to select as the output for the switch the output of circuit 758. Circuit 758 substracts the output of LUT circuit 732 from 119. Hence, for θ=−45°, LUT circuit 732 provides a 16 bit signal equal to 119 which is then subtracted in circuit 758 from 119 yielding zero. When x is positive switch 757 passes the output of LUT 732 through switch 756 directly to the output. In summary the LUT circuit 732, summing circuit 758 and switch 757 provide the equations:

Line No.=(θ)(119/90)+119/2 for 0°≦θ≦45°

Line No.=119/2−(θ)(119/90) for −45°≦θ≦0°

Also, note that a 16 bit signal for 119 provided as a second input to switch 756. This serves a similar purpose as the input of 1/Cos(45°) to switch 740. In order to form sharp lines along the radials θ=±45°, i.e. when x=y, switch 756 in response to the x/y OVF signal from circuit 722 switches line no. 119 to the output regardless of the output of LUT circuit 732.

From switching circuit 757, a 16 bit signal representing the line no. equivalent of θ is provided to summing circuit 760. The other input to summing circuit 760 is from LUT circuit 762 whose output signal is combined with the output signal of switch 757 in circuit 760. The output of LUT circuit 762 is a correction factor to be added to the calculation of the line number when an oscillating wobbler scanhead is used with scanner 110.

By referring now to FIG. 8, the correction required when using oscillating wobbler type scanheads (known as the hose correction) can best be explained. As the scanhead 802 rotates back and forth along the direction of curved line and arrows 804 it transmits a series of pulses directed along a transmit path defined by the axis 806 of the scanhead. The scanhead is equipped with an encoder which transmits a digital signal representing the angle of rotation of the axis at the time of transmission of a pulse as measured from an arbitrary starting point, e.g. 0°. However, before the next pulse is transmitted, the current transmitted pulse travels through the image medium encountering discontinuities which result in echos being transmitted back along the original transmitted path. However, by the time the echos return to the scanhead the scanhead as rotated an angle Δθ from its original transmit position. The amount of Δθ is greater for the echos returning from greater radii.

Each time the output of the scanhead is sampled to generate a received echo signal, the receive aperture has moved away from the transmit aperture, resulting in a positional error. This error changes the value of measurements taken from the images, which is highly undesirable to the physician. Since the scanhead swings in the opposite direction in each frame, the error changes sign from one frame to the next, which introduces a very distracting side-to-side flicker into the image.

For a given radius the $\Delta\theta$ error is proportional to the angular velocity, $\omega$, of the scanhead and inversely proportional to the velocity, v, of ultrasound in the image medium. LUT circuit 762 is provided with the 16 bit radius signal, r, from circuit 744 and with a fixed signal proportional to $\omega/v$. Depending on r, LUT circuit 762 provides a hose correction number equal to $\Delta\theta/2$ to summing circuit 760 to be substracted from the output signal of circuit 757 when the scanhead rotates in the direction of increasing line numbers and to be added to the output signal of circuit 757 when rotating in the direction of decreasing line numbers. $\Delta\theta/2$ is used instead of $\Delta\theta$ because the net aperture lies halfway between the transmit and receive apertures.

The output of circuit 760 is provided as a 16 bit signal to switch 764 along with the x signal directly from x register 610. In response to the LIN/Sector signal, switch 764 chooses either the output of circuit 760 (Line No.) or x for the output called a column signal. The column signal is only 14 bits with 7 bits for the integer portion and 7 bits for the fractional part.

The integer portion of the row signal bits 0 through 8 from switch 748 and the integer portion of the column signals (bits 0 through 6) from switch 764 are provided via bus 132 to memory control 130 while the fractional bits of the row and column signals are transmitted via bus 134 to filter circuit 160. Before discussing the filter circuit 160 a more detailed explanation of an addressing portion designated generally 900 in FIG. 9 of the memory control 130 relating to addressing of the received echo signals is provided.

Figure 9:
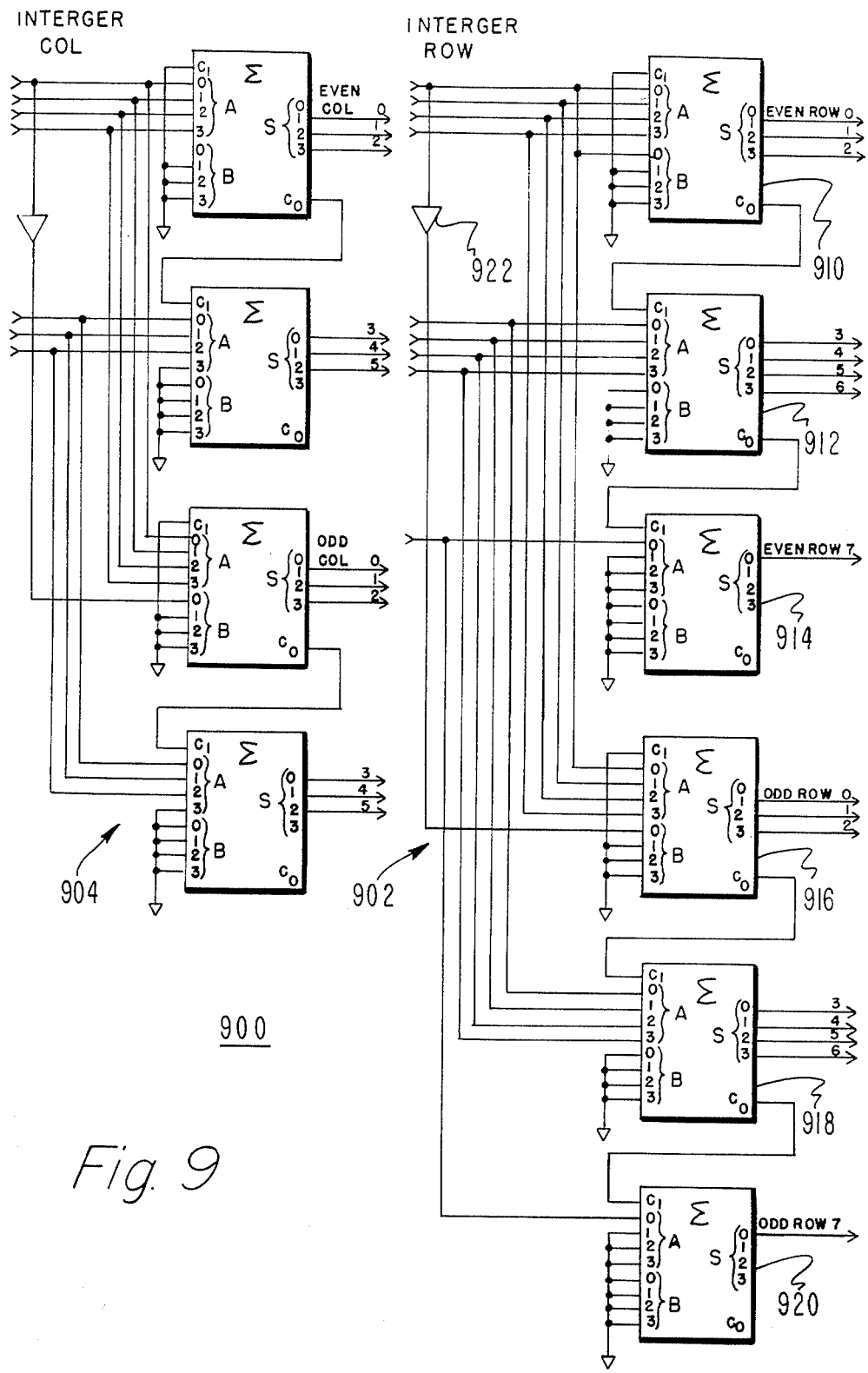
FIG. 9 is a more detailed block diagram of a first portion of the memory control of FIG. 1.

Referring now to FIGS. 2, 3 and 9, the integer portions of the mixed signals provided by switches 748 and 764 identify the location of an acquired data sample in the image space (i.e. the member of a spaced apart path and the number of a sample row along the path) which is one of the four nearest acquired data samples to the location of the selected display pixel in the image space. Remember the location of the display pixel in the display space was previously converted into a pair of mixed x and y signals by the circuit of FIG. 6 and subsequently converted to a pair of polar mixed signals by the circuit of FIG. 7 when sector scanning is employed. The four acquired data samples nearest the display pixel define an area in the image space in which the selected display pixel is located. See FIG. 2.

The location of the acquired data sample defined by the integer portions of the mixed signals is given by the intersection of one of the spaced apart paths occurring on either side of the selected display pixel (corresponding to columns in the scan data memory 120) with one of the lines on either side of the selected display pixel relating to a particular sample row or depth of penetration (corresponding to rows in the scan data memory 120). In particular in polar coordinates, if the location of the acquired data sample defined by the integer portions is defined by the coordinate designations $R_n, \theta_n$, where n is an integer, than the three remaining locations of the four nearest acquired data samples are $R_n, \theta_n+1$; $R_n+1$, $\theta_n$; and $R_n+1$, $\theta_n+1$. See FIG. 2 again. It is apparent that the four nearest acquired data samples are located at combinations of even and odd column and row addresses in the scan data memory 120.

In accordance with the manner of storing acquired data samples from sequential scan lines in rows and columns of the memory quadrants 550, 552, 554 and 556 as described earlier, it should be appreciated that as data is stored along a column in the memory, even rows of data starting with row 0 are stored in sequential addresses located in even row quadrants while odd rows of data starting with row 1 are stored in sequential addresses located in odd row quadrants. For example, rows 0, 2, 4 . . . are stored in addresses 0, 1, 2 . . . in quadrants 550 or 552 while rows 1, 3, 5 . . . are stored in addresses 0, 1, 2 in odd row quadrants 554, 556. The same can be said of the storage of even and odd columns. In order to access the four acquired data samples nearest the display point from the four quadrants the memory addressing circuit designated generally 900 of FIG. 9 is employed.

Memory addressing circuit 900 comprises an even row, odd row addressing portion 902 and an even column, odd column addressing portion 904. Circuit 902 comprises a first grouping of adder circuits 910, 912 and 914 which are coupled together in a predetermined way to generate an eight bit even row address. The four least significant bits of the integer row number are provided to the A input terminals of adder 910, while the next most significant four bits are provided to the A input terminals of adder 912 and the least significant bit to the A input terminal of adder 914. The least significant bit is also coupled to the B₀ input terminal of adder 912. The carry in terminal (C1) of adder circuit 910 is grounded but the carry out (C0) terminal of 910 is coupled to the C1 terminal of adder 912, and the C0 terminal of adder 912 is coupled to the C1 terminal of adder circuit 914.

Circuit 902 further comprises a second grouping of adder circuits 916, 918 and 920 which are similarly wired to generate an odd row address, except that the least significant bit of the row integer input signal is inverted by inverter 922 and provided to B₀ input of adder circuit 916.

Inspection of the above arrangement of circuit 902 will show that the following even and odd addresses are formed in response to the integer portion, n, of the row signal from switch 748:

even row address n/2 when the row integer input signal, n, is even;

even row address (n+1)/2 when the row integer input signal, n, is odd;

odd row address n/2 when the row integer input signal, n, is even;

odd row address (n−1)/2 when the row integer input signal, n, is odd. The output signals of course are provided in binary form.

If the particular row identified by the row integer portion of the mixed numbers from either switch 748 or 764 identifies row 7, for example, than the two rows from which the four acquired data samples nearest the location of the display pixel are to be chosen should be rows 7 and 8. Because of the manner in which the rows are stored in sequential addresses in the odd and even row memory quadrants, row 7 should be found in address 3 in either quadrants 554 or 556. For an odd row integer input, 7, the formula for the odd address is (n−1)/2 which equals 3. For the even address from circuit 902, again because of the manner in which the even rows are stored sequentially in the even quadrants, the even address formula tells us that for row 7 the even row address should be (n+1)/2 which equals 4. Hence, the circuit 902 serves to provide the proper sequential addresses in the even and odd row quadrants for a given row identified by the row integer portion of the mixed numbers.

Circuit 904 is a combination of adder circuits for generating even and odd column addresses which are coupled in the same manner as circuit 902.

The even row address signals from circuit 902 are sent to quadrants 550 and 552 and the odd row address signals from circuit 902 are transmitted to quadrants 554 and 556, while the even column address signals from circuit 904 are transmitted to quadrants 550 and 554 and the odd column address signals from circuit 904 are transmitted to the quadrants 552 and 556.

The 7 bit fractional portion of the mixed row signal from switch 748, and the 7 bit fractional portion of the mixed column signal from switch 764 are transmitted via bus 162 to the filter circuit 160. Also, transmitted to filter circuit 160 over bus 122 are four 6 bit words representing the acquired data sample values of the four acquired data samples nearest the display pixel, the acquired data samples represented as: $f(R_n, \theta_{n+1})$; $f(R_{n+1}, \theta_{n+1})$; $f(R_n, \theta_n)$; and $f(R_{n+1}, \theta_n)$. Filter circuit 160 is a conventional integrated circuit implementation of the following algorithm for combining the four acquired data samples and the fractional row and column number signals, designated S and T, respectively, to obtain an interpolated gray scale value at the display pixel location in question:

$$f_1 = f(R_n, \theta_{n+1}) + S[f(R_{n+1}, \theta_{n+1}) - f(R_n, \theta_{n+1})]$$

$$f_2 = f(R_n, \theta_n) + S[f(R_{n+1}, \theta_n) - f(R_n, \theta_n)]$$

$$f(R_n + S, \theta_n + T) = f_2 + T(f_1 - f_2)$$

Figure 10:
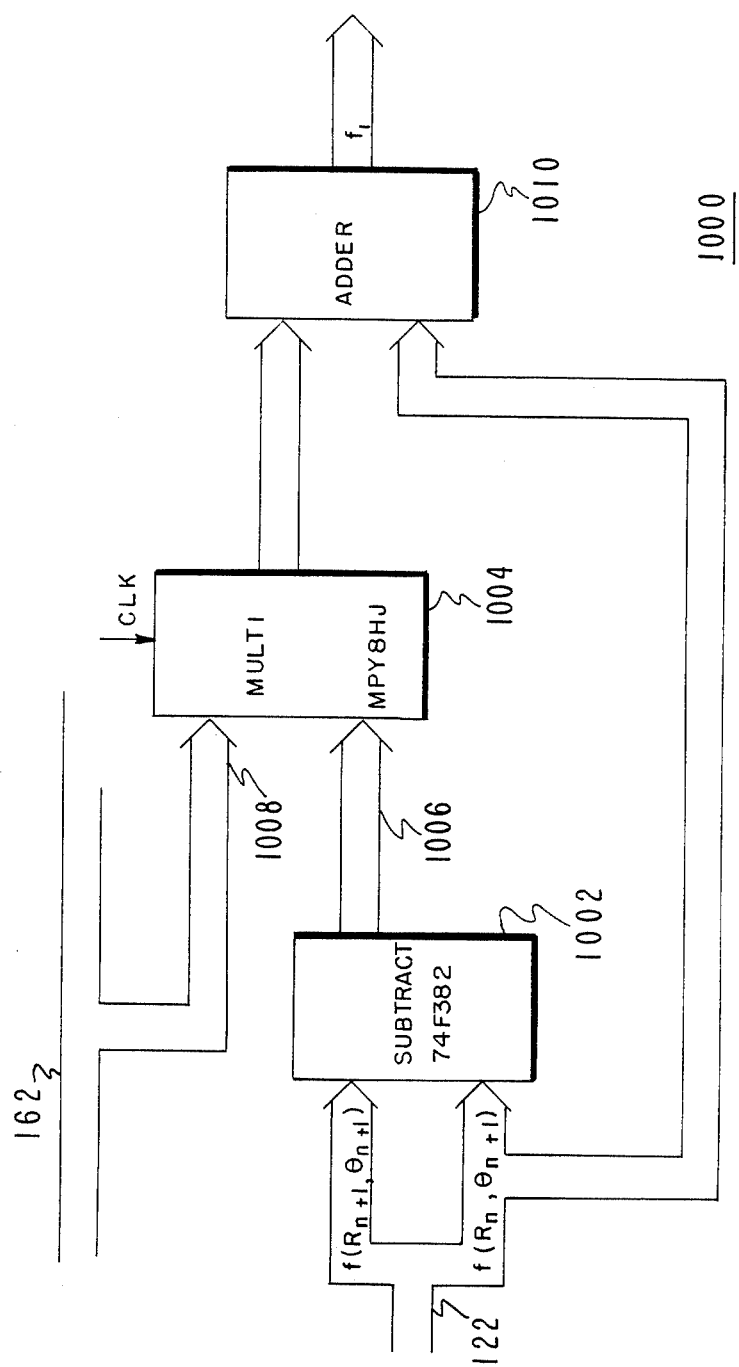
FIG. 10 is a more detailed block diagram of a portion of the filter of FIG. 1.

Inspection of the three equations above shows that each equation can be implemented in the essentially the same manner. FIG. 10 shows a circuit designated generally 1000 for implementing the first equation for $f_1$. The remaining circuits are similar and are not shown.

Referring now to FIG. 10, the acquired data samples lying along scan line $\theta_{n+1}$ at arcs $R_n$ and $R_{n+1}$ are provided as 6 bit words from bus 122 to subtraction circuit 1002. Subtraction circuit 1002 subtracts $f(R_n, \theta_{n+1})$ from $f(R_{n+1}, \theta_{n+1})$ and provides the 6 bit output to multiplier 1004 over bus 1006. Six bits of the 7 bits of the fraction portion of the row integer number from switch 748 are transmitted over bus 1008 from bus 162 to multiplier circuit 1004. The least significant bit of the 7 bits is used as a rotation indicator. Multiplier 1004 multiplies the two inputs to form:

$$S[f(R_{n+1}, \theta_{n+1}) - f(R_n, \theta_{n+1})].$$

The output of multiplier circuit 1004 is added to $f(R_n, \theta_{n+1})$ in adder circuit 1010. The output of 1010 if $f_1$. $f_2$ and $f(R_n + S, \theta_n + T)$ are implemented in an identical manner except for the function $f(R_n + S, \theta_n + T)$ where the fractional portion of the column mixed signal from switch 764 is used as T in the multiplier circuit instead of S and the functions $f_1$ and $f_2$ are used as the other signal inputs instead of the acquired data signals from memory 120.

It should be appreciated that the above algorithm for combining the four acquired data samples is not the only way in which the four acquired data samples can be combined to provide a gray scale value for the display pixel. Instead of finding a first intermediate interpolated values $f_1$ and along a first spaced apart path on one side of the display pixel, and then a second intermediate interpolated value $f_2$ along a second spaced apart path on an opposite side of the display pixel before interpolating a final interpolated value between the spaced apart paths at the display pixel location using the intermediate interpolated values $f_1$ and $f_2$, the interpolation could be performed by forming intermediate interpolation values first along one arc on one side of the display pixel and then along a second arc on another side of the display pixel. Then the intermediate interpolated values found along the two arcs can be interpolated radially to obtain the final interpolation value. Using the latter approach, the circuitry shown in FIG. 11 would be identical but the signals provided as inputs would be rearranged in accordance with the following alternate algorithm:

$$f_1 = f(R_n, \theta_n) + T[f(R_n, \theta_{n+1}) - f(R_n, \theta_n)]$$

$$f_2 = f(R_{n1}, \theta_n) + T[f(R_{n+1}, \theta_{n+1}) - f(R_{n+1}, \theta_n)]$$

$$f(R_n + S, \theta_n + T) = f_2 + S(f_1 - f_2)$$

Figure 11:
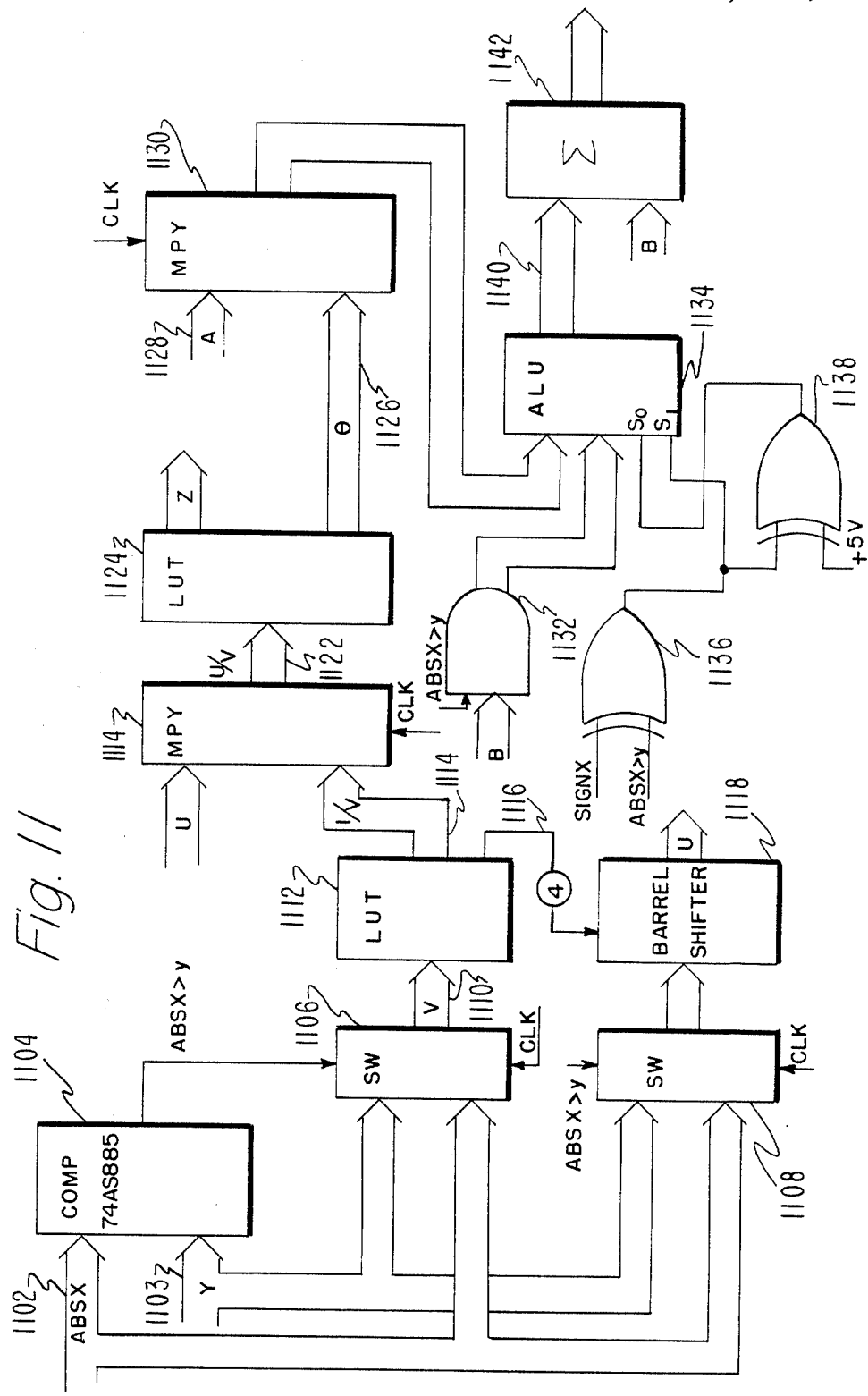
FIG. 11 is an alternate embodiment of a portion of the address generator portion of FIG. 1.

Referring back now to FIG. 7, it should be remembered that multiplier circuit 722 always provides an ABSx/y output signal for use by LUT circuit 732 when determining the line number to be assigned to the angle $\theta$. The arrangement of the multiplier circuit 722 and the programming of the LUT circuit 732 are based upon a 90° sector scan for $\theta$ varying from −45° to +45°. FIG. 11 shows an alternate embodiment of a circuit designated generally 1100 which allows for operation over a 180° sector scan.

Before discussing FIG. 11 in more detail, it is instructive to note that in a polar coordinate system such as the one shown in space 520 in FIG. 5 where angles are measured negatively in a clockwise direction from the polar axis 316 and positively in a counterclockwise direction from polar axis 316 that the 180° sector can be thought of as four 45° sectors: from −90° (in the direction of negative x axis) to −45°; from −45° to 0°; from 0° to +45°; and from +45° to +90° (along the positve x axis).

Using ABSx signals and determing the angle displacement within a 45° subsector from the formula $$\tan^{-1}(w/v),$$

where w is the larger of ABSx and y, and v the smaller, a LUT storing values $\tan^{-1}(w/v)$ for angles between 0° and 45° is all that is required. Hence, the entire 180° sector is folded within a single subsector for determining the angular displacement of the selected display pixel within the single subsector. Also, it should be noted that ABSx is greater than y in the −90° to −45° region and in the 45° to 90° region.

Referring now to FIG. 11, a 16 bit ABSx signal and a 16 bit y signal are provided via buses 1102 and 1103, respectively, to the comparator circuit 1104 and switching circuits 1106 and 1108. The ABSx and y signals are generated in a manner described earlier in connection with a description of FIG. 6. Comparator circuit 1104 transmits a high signal to switches 1106 and 1108 if the ABSx signal is greater than the y signal and low if it is not.

Switch 1106 transmits the lower of the two input signals, ABSx or y, in response to the signal ABSx>y from circuit 1104. The output is designated v and is transmitted over bus 1110 to LUT circuit 1112 which serves an identical purpose as LUT circuit 704 in FIG. 7. LUT circuit 1112 transmits a 12 bit signal, 1/v, to multiplier circuit 1114. At the same time LUT circuit 1112 transmits a 4 bit signal over line 1116 to barrel shifter circuit 1118 which is similar in purpose to circuit 714 of FIG. 7. Switch 1108 in response to ABSx>y transmits the larger of its two input signals ABSx or y to circuit 1118. In response to the 4 bit signal on line 1116, circuit 1118 chooses an appropriate subset of 12 bits of the input signals for transmission as signal w. The w signal is transmitted via bus 1120 to the other input of multiplier circuit 1114 where it is multiplied with 1/v to form w/v. w/v is transmitted via bus 1122 to LUT circuit 1124.

LUT circuit 1124 can be either two separate LUT circuits performing the functions of LUT circuit 730 and 732 in FIG. 7 or, alternatively, the functions can be combined in one LUT arrangement such LUT circuit 1124 in FIG. 11. One output of LUT circuit 1124 is a 12 bit factor, z, used in calculating the mixed radial signal, r, in a manner as described in connection with FIG. 7. Also, LUT circuit 1124 provides a 12 bit angle displacement signal which varies from 0° to 45° and is equal to $\tan^{-1}(w/v)$ Because of the substitution of variables, w for the larger of ABSx or y, and v for the smaller, the angle displacement signal will always be positive regardless of which 45° subsector within the 180° overall sector, the display pixel is located in. Accordingly, circuitry must be provided to unfold the sector, i.e. to assign a line number to the angle displacement which takes this into account.

The angle displacement signal from LUT circuit 1124 is provided over bus 1126 along with a signal equal to a constant, A, over bus 1128 to the multiplier circuit 1130. The value of the constant, A, is found by dividing the number of spaced apart paths occurring within the sector divided by the size of the sector. The output of multiplier circuit 1130 is $(\theta)(A)$ which represents the number of lines that are contained in the displacement angle signal equal to $\tan^{-1}(w/v)$ provided by LUT 1124 within a particular 45° sector.

In the preferred embodiment it is desirable in a 180° sector scan region that the sector scan line number occurring at −90° be 0. With the line number increasing as the sector scan angle increases with the maximum line number being assigned to the scan angle +90°. In order to accomplish this a signal equal to a constant, B, equal to the number of spaced apart paths occurring in a 90° sector is provided via AND gate 1132 to a first input of arithmetic logic unit (ALU) circuit 1134. The second input to ALU 1134 is the output signal $(\theta)(A)$ from multiplier circuit 1130. The other input to AND gate 1132 is the signal ABSx>y.

The signal SIGNX and ABSx>y are provided to exclusive OR gate 1136. Remember the x signal was provided as a 2's complement signal and SIGNX is merely the most significant bit provided with signal x. The output of exclusive OR gate 1136 is provided to the $S_1$ input of ALU 1134 and to exclusive OR gate 1138. The other input to exclusive OR gate 1138 is a constant high signal. The output of exclusive OR gate 1138 is provided to the $S_0$ signal input of ALU 1134. The output of LUT 1134 is provided via bus 1140 to summing circuit 1142 along with the constant, B.

The output of the summing circuit 1142 is the mixed line number to be assigned to the angle displacement signal from LUT circuit 1124 for the particular sector of interest. The above described circuit operates in the following manner:

For the −90° to −45° sector, SIGNx is negative and ABSx>y is positive. AND gate 1132 passes B to ALU circuit 1134 and the output of exclusive OR gate 1136 is high. The output of exclusive OR gate 1138 is low. When $S_0$ is low and $S_1$ high, ALU circuit 1134 subtracts the first signal input, B, from the second input signal, $(\theta)(A)$. The signal $(\theta)(A)-B$ is transmitted via bus 1140 to summing circuit 1142 where it is added with B. The mixed line number output from summing circuit 1142 is $(\theta)(A)$ for the sector −90° to −45°.

For the sector −45° to 0°, SIGNX is negative and ABSx>y is also negative. AND gate 1132 will not pass B to ALU circuit 1134. The output of exclusive OR gate 1136 is low and the output of exclusive OR gate 1138 is high. When $S_0$ is high and $S_1$ is low, ALU circuit 1134 subtracts the second input signal, $(\theta)(A)$, from the first input which for the sector −45° to 0° is 0. ALU 1134 transmits $-(\theta)(A)$ to summing circuit 1142 where it is summed with B. The mixed line number for the sector −45° to 0° is $B-(\theta)(A)$.

For the sector 0° to +45°, SIGNX is positive and ABSx>y is negative. AND gate 1132 will not pass B to ALU 1134. The output of exclusive OR gate 1136 is positive while the output of exclusive OR gate 1138 is negative. When $S_0$ is low and $S_1$ high, ALU 1134 subtracts the first input signal from the second input signal resulting in positive $(\theta)(A)$ since the first input signal is 0 for the sector 0° to +45°. ALU circuit 1134 transmits the signal $(\theta)(A)$ to summing circuit 1142 where it is added with B. The mixed line number assigned for the sectors 0° to 45° is $(\theta)(A)+B$.

Finally, for the sector 45° to 90°, ABSx>y is positive and SIGNX is positive. AND gate 1132 passes B to ALU circuit 1134 and the output of exclusive OR gate 1136 is negative. The output of exclusive OR gate 1138 is positive. When $S_0$ is high and $S_1$ low, ALU 1134 subtracts the second input signal from the first input signal. The signal $B-(\theta)(A)$ is transmitted via bus 1140 to summing circuit 1142 where it is added with B. The output of summing circuit 1142 is therefore $2B-(\theta)(A)$.

In summary,

| Sector | Line Number Formula |
| --- | --- |
| −90° to −45° | $(\theta)(A)$ |
| −45° to 0° | $B-(\theta)(A)$ |
| 0° to 45° | $(\theta)(A)+B$ |
| 45° to 90° | $B+B-(\theta)(A)$ |

As an example, consider that there are 120 scan lines per 180° sector. A therefore is 120/180=2/3 and B=120÷2=60. LUT 1124 provides $\theta$ values 0° to 45° for the sector −90° to −45°. Plugging these values into the formula $\theta A$ we get line number 0 for sector angle −90° and line number for sector angle −45°.

For the sector −45° to 0°, LUT 1124 provides $\theta$ angles for 45° to 0°. Plugging these values with the appropriate values of A and B into the formula $B-\theta A$, line number 30 is assigned to sector angle −45° and line number 60 is assigned to sector angle 0°.

For the sector 0° to 45° the LUT 1124 provides θ angles 0° to 45°. Plugging these values into the formula θA+B we obtain line number equal to 60 at sector angle equal to 0° and line number equal to 90 for θ angle equal to 45°.

Finally, for the sector 45° to 90°, LUT 1124 provides θ angles 45° to 0°. Plugging these values into the formula 2B−θA we obtain line number for the sector angle 45° and line number 120 for sector equal to 90°.

The various drawings for FIGS. 6–10, and alternatively FIG. 11 for part of FIG. 7, show the switching, registers and multiplying circuit being clocked by the basic pixel clock, CLK, which is at a 12.4 MHz rate. This clock was discussed in connection with FIG. 4. However, it should be appreciated that all of the processing described by FIG. 6–10 and 11 are not done simultaneously on the x and y signals. The apparatus described in the figures is a pipe line processor. For clarity the various registers which delay the processing of the signals, particulary in the parallel portions of the circuit like the parallel processing of the output of multiplier circuit 722 in FIG. 7 have not been shown. To show the timing of the parallel processing of the various signals through the circuit so that the row and column mixed numbers are produced at the memory addressing and filter circuits together is best explained in connection with FIG. 12 which is a state diagram of the processing transaction.

Referring now to FIGS. 12, 6, 7 and 11, the left hand column of FIG. 12 numbered sequentially from 0 through 19 represents the 20 consecutive clock signals from the step of incrementing x along a particular raster scan to identify a selected display pixel through the operation of the algorithm of FIG. 10 to determine the final interpolated gray scale value to be assigned to the selected display pixel.

Clock 0 shows the step of incrementing the x value wherein the incremented x value is placed in register 610. In next clock interval (1) the absolute value of x is determined (circuit 712). Of course at the same time that the absolute value of x is being determined, x is again incremented to start the processing of the next selected display pixel. In fact, during each clock pulse described below for the processing of a particular display pixel, a new display pixel is selected by incrementation of the value x and the processing begun in parallel.

In clock period 2, the ABSx signal is compared with y and variables w and v are substituted for x and y (See comparator circuit 1104 and switches 1106 and 1108.) During clock interval 3, LUT circuit 1112 determines 1/v and a shift factor is transmitted to the barrel shift circuit 1118. Meanwhile, the w and v signals are delayed being stored in registers not shown. In clock period 4, 1/v and w are delayed and w is shifted in the barrel shifter circuit 1118 to obtain a 12 bit subset for transmission to multiplying circuit 1114. In clock period 5, the subset of w and 1/v are multiplied and v is delayed further.

Next (clock 6) the factor z equal to [(1/Cos θ)−1]and θ are determined in LUT circuit 1124 and stored in a register while v is delayed again. In clock period 7, θ is converted to a line number in multiplying circuit 730 while z and y are multiplied together in multiplying circuits 742. v is delayed once more. The particular 45° sector of interest is unfolded in clock 8 at ALU 1134 while at the same time y is added to yz in circuits 744 to determine the mixed row number. In clock 9, the sector rotation factor B is added (in circuit 1142) to the output of ALU 1134, and the hose correction factor is determined by LUT circuit 762. The mixed row number output of circuit 744 is delayed. Next (clock 10) the hose correction factor is added in circuit 760 to the line number determined by circuit 1142. A skin line offset factor is added to the mixed row signal in this clock period also.

During clock pulses 11 through 17, the fractional portion of the mixed column signal from switching circuit 764 is delayed and during clock pulses 11–14 the fractional portion of the mixed row signal is delayed. The fractional portions of the mixed row and column signals are delayed while the integer portions of the row and column signals are used by the memory addressing circuit of FIG. 9 to latch the four acquired data samples from memory 120 to filter circuit 160. During clock pulses 15–17 fractional portion of the mixed row signal is used to determine the intermediate interpolation values $f_1$ and $f_2$ as in FIG. 10. Then in clock pulses 18 and 19 the fractional portion of the mixed column signals are used to complete the interpolation.

What is claimed is:

1. A scan converter for operation in both the linear and sector scan modes for converting received echo signals representative of the amplitude of ultrasound energy returning from sample points along a plurality of spaced apart paths distributed in an image space into signals to be displayed as display pixels along a plurality of successive raster scan lines distributed in a display space, each of said received echo signals being received from either an even or odd numbered spaced apart path and located in an even or odd sample row along said spaced apart paths, said scan converter comprising:

a scan data memory for storing each of said received echo signals in one of four memory quadrants, said quadrants associated with even and odd spaced apart path and sample row combinations; and circuit means coupled to said scan data memory means for determining a gray scale value for assignment to a selected display pixel chosen successively from display pixels lying along a raster scan line by combining in a predetermined way the stored received echo signals from four sample points adjacent said selected display pixel, said received echo signals from four sample points comprising one from each of said four quadrants.

2. The scan converter of claim 1 wherein said scan data memory further comprises:

at least a pair of scan data memories, each having four quadrants associated with four even and odd spaced apart path and sample row combinations, wherein received echo signals from a current scan of said image space are stored in one of said at least a pair of scan data memories while received echo signals from a previous scan of said image space stored in the remaining one of said at least a pair of scan data memories are being combined by said circuit means asynchronously from the storing of said currently received echo signals in said one of said at least a pair.

3. The scan converter of claim 1 wherein said circuit means further comprises:

means for generating a pair of signals associated with said selected display pixel, said pair of signals including a mixed path signal and a mixed sample row signal; and memory addressing means responsive to the integer portions of said mixed path and sample row signals for generating scan data memory addresses of said four adjacent points which addresses include: an even row/even column address; an odd row/even column address; an even row/odd column address; and an odd row/odd column address.

4. The scan converter of claim 3 wherein said circuit means further comprises a filter circuit coupled to said scan data memory and responsive to said fractional portions of said mixed path and sample row signals for combining in a predetermined way said four adjacent received echo signals and said fractional portions whereby a gray scale value for said selected display pixel is determined.

5. The scan converter of claim 4 wherein said filter circuit further comprises:
means for forming a first intermediate gray scale value from a pair of received echo signals on a first side of said selected display pixel and a first one of said fractional portions;
means for forming a second intermediate gray scale value from a pair of received echo signals on a second side of said selected display pixel opposite from said first side and said first one of said fractional portions; and
means for forming a final gray scale value from said first and second intermediate gray scale values and the remaining one of said fractional portions.

6. The scan converter of claim 4 wherein said means for generating a pair of mixed numbers further comprises:
means for generating mixed orthogonal column and row signals associated with the location of the selected display pixel within a linear image space;
means responsive to said mixed orthogonal column and row signals for generating mixed polar signals associated with the location of said selected display pixel within a sector image space; and
switching means for switching between the output of said means for generating mixed orthogonal column and row signals and said means for generating mixed polar signals, said switching means operative in response to a signal indicating whether said scan converter is operating in said linear or said sector scan modes.

7. The scan converter of claim 1 wherein said scanning mode is a sector scan mode generated by an oscillating wobbler scan head and said circuit means further comprises;
means for correcting the hose error associated with oscillating wobbler scan heads.

8. The scan converter of claim 1 wherein said circuit means further comprises means for changing the scaling between the display space and the image space.

9. A coordinate conversion circuit for use in a scan converter for converting received echo signals representative of the amplitude of ultrasound energy returning from sample points along a plurality of angularly spaced apart paths distributed in a sector image space into signals to be displayed as display pixels along a plurality of successive raster scan lines distributed in a display space, said coordinate conversion circuit comprising:
means for generating orthogonal x and y signals associated with the location of the selected display pixel within the display space;
conversion means responsive to said orthogonal x and y signals for generating angle and radial signals associated with the location of said selected display pixel within said sector image space, said conversion means further comprising:
means for folding said sector image space into a single subsector smaller than said sector image space;
means coupled to said sector folding means for determining an angle displacement associated with said selected display pixel within said single subsector; and
means coupled to said angle displacement means for unfolding said sector image space and for generating said angle signal.

10. The scan converter of claim 9 wherein: said means for folding said sector image space comprises:
means for providing w output signals substantially equal to the larger of the absolute value of said x signals or said y signals, and v signals substantially equal to the smaller signals; and
wherein said means for determining an angle displacement comprises:
means for providing an output signal proportional to w/v;
means for providing a single subsector angle signal substantially equal to $\tan^{-1}(w/v)$.

11. The coordinate conversion circuit of claim 10 wherein said means for providing a w/v output signal comprises means for multiplying w and 1/v, where w is a multi-bit number having more bits than 1/v and said w/v multipling means further comprises means for selecting a subset number of bits of w equal to the number of bits in 1/v which subset number of bits differs depending on the magnitude of v.

12. The coordinate conversion circuit of claim 11 wherein said w/v multiplying means further comprises:
a 1/v lookup table for determining 1/v in response to v and for providing an output signal proportional to the magnitude of v;
circuit means having parallel input terminals to receive w and parallel output terminals to deliver a subset of the bits contained in w, said circuit means for shifting the input means of w to a subset of output bits in response to the output signal from the lookup table;
multiplying means for multiplying the 1/v output of the lookup table with the shifted subset output bits from the circuit means.

13. A coordinate conversion circuit for use in a scan converter for converting received echo signals representative of the amplitude of ultrasound energy returning from sample points along a plurality of angularly spaced apart paths distributed in a sector image space into signals to be displayed as display pixels along a plurality of successive raster scan lines distributed in a display space, said coordinate conversion circuit comprising:
means for generating orthogonal x and y signals associated with the location of the selected display pixel within the display space;
conversion means responsive to said orthogonal x and y signals for generating angle and radial signals associated with the location of said selected display pixel within said sector image space, said conversion means further comprising:
means for generating said radial signal proportional to $y/\cos\theta$ where $\cos\theta$ is determined from said x and y signals, said means for generating said radial signals comprising:
means for multiplying y and $[(1/\cos\theta)-1]$ and means for adding y to the output of said multiplying means.

* * * * *